United States Patent [19]

Hirayama et al.

[11] Patent Number: 4,975,542
[45] Date of Patent: Dec. 4, 1990

[54] METHOD FOR PREPARING GRANULAR POROUS CHITOSAN

[75] Inventors: Chuichi Hirayama, 373-12, Shimonabemachi; Hirotaka Ihara, 854-2, Oazatakahira, Shimizumachi, both of Kumamoto-Shi, Kumamoto; Junichi Ida, Tokyo, all of Japan

[73] Assignees: Kurita Water Industries Ltd., Tokyo; Chuichi Hirayama; Hirotaka Ihara, both of Kumamoto, all of Japan

[21] Appl. No.: 354,025

[22] Filed: May 19, 1989

[30] Foreign Application Priority Data

May 30, 1988 [JP] Japan .................. 63-134001

[51] Int. Cl.$^5$ .................. C08B 37/00; A61K 31/00
[52] U.S. Cl. .................. 536/20; 536/55.3
[58] Field of Search .................. 536/20, 55.3; 514/55

[56] References Cited

U.S. PATENT DOCUMENTS

| 4,336,070 | 6/1982 | Koshugi | 536/20 |
| 4,619,995 | 10/1986 | Hayes | 536/20 |
| 4,833,237 | 5/1989 | Kawamura et al. | 536/20 |
| 4,879,340 | 11/1989 | Moriguchi et al. | 536/20 |

FOREIGN PATENT DOCUMENTS

| 3527482 | 2/1986 | Fed. Rep. of Germany . | |
| 58-57401 | 4/1983 | Japan . | |
| 60-186504 | 9/1985 | Japan | 536/20 |
| 61-40337 | 2/1986 | Japan . | |
| 62-79201 | 4/1987 | Japan | 536/20 |

*Primary Examiner*—Ronald W. Griffin
*Assistant Examiner*—Everett White
*Attorney, Agent, or Firm*—Kanesaka and Takeuchi

[57] ABSTRACT

A method for preparing granular porous chitosan which comprises dispersing an acidic aqueous solution of chitosan in a hydrophobic dispersing medium; and, evaporating water off while stirring the resulting dispersion.

17 Claims, No Drawings

METHOD FOR PREPARING GRANULAR POROUS CHITOSAN

FIELD OF THE INVENTION AND RELATED ART STATEMENT

The present invention relates to a method for preparing granular porous chitosan which is extremely suited as fillers for chromatography, immobilized enzyme carriers, etc.

Chitosan is deacetylated chitin and can be obtained by heating chitin together with a concentrated alkali.

Chitin is a kind of polysaccharide composed of aminosugar and consists of a straight chain molecule by binding D-glucosamines, in which each amino group is acetylted, by $\beta$-1,4 linkage. Its chemical structure and properties are similar to those of cellulose. Also from a biological viewpoint, chitin is a major structural polysaccharide in invertebrate animals and lower plants.

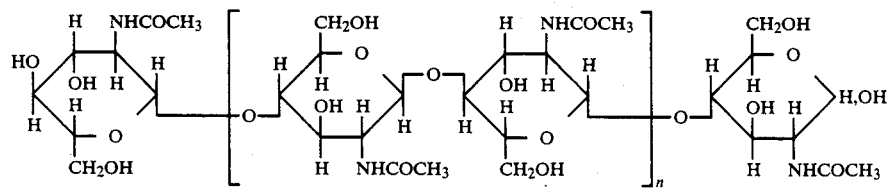

Chitin exists as an organic skeletal substance for an arthropod, an anmelid, a mollusk, etc. and is markedly present particularly in outer skeletons of the arthropod, for example, outer skin of Crustacea such as prawns, crabs, etc. In plants, chitin is present in hyphae or spores of molds.

When chitosan is dissolved in a solvent, a viscosity of the solution becomes extremely high and is almost gelled even though its concentration is several percent, since intermolecular hydrogen bond is strong; in this case, it is difficult to handle the solution.

In the case that chitosan is granulated in a solidified basic solution, it is necessary to use chitosan in a high concentration to a certain extent, otherwise the resulting granules swell to be tacky and cannot be used practically.

Therefore, in Japanese Patent Application Laid-Open No. 61-40337, low molecular chitosan is used so that its concentration is increased to a certain level in an acidic solution used as a granulating solution.

That is, methods (1) through (5) for preparing granular porous chitosan described below are claimed in Japanese Patent Application Laid-Open No. 61-40337:

(1) A method for preparing granular porous chitosan which comprises dissolving low molecular chitosan in an acidic aqueous solution and dropping the solution in a basic solution thereby to solidify and precipitate porous chitosan.

(2) A method according to claim 1, wherein a mean molecular weight of the low molecular chitosan is in a range of 10,000 to 230,000.

(3) A method according to claim 1, wherein a solubility of the low molecular chitosan is in a range of 2 to 20 wt %.

(4) A method according to claim 1, wherein said basic solution is composed of a basic substance and water, or a basic substance, water and an alcohol, or a basic substance and an alcohol.

(5) A method according to claim 4, wherein said basic solution is composed of any one of NaOH-water, NaOH-alcohol-water, ethylenediamine-alcohol, ammonia-water and ammonia-alcohol-water.

In such a method, however, chitosan should be previously degraded to low molecular weight. Since the step of rendering low molecular weight is complicated and costly, the method is not necessarily satisfactory.

On the other hand, the composition of the basic solution used as a solidifying solution affects porous properties of chitosan granules so that it is necessary to keep the composition constant during the course of reaction. However, chitosan which is dropped in the solidifying solution is used as an acidic solution. Therefore, as chitosan is added, neutralization occurs. In this case, operations for keeping the composition of solidifying solution constant are extremely complicated.

OBJECTS AND SUMMARY OF THE INVENTION

An object of the present invention is to provide an efficient method for preparing granular porous chitosan which is unnecessary to use any basic solidifying solution, in particular, without degrading chitosan to low molecular weight.

Another object of the present invention is to provide a method for preparing granular porous chitosan in which a grain diameter and a pore diameter can be readily controlled.

The present invention relates to a method for preparing granular porous chitosan which comprises dispersing an acidic aqueous solution of chitosan in a hydrophobic dispersing medium and evaporating water off while stirring the resulting despersion.

DESCRIPTION OF THE PREFERRED EMBODIMENTS

Chitosan which is a starting material in the present invention can be obtained by heating chitin generally contained in outer skin of Crustacea such as crabs, prawns, etc. together with an concentrated alkali to cause deacetylation. In general, the thus obtained chitosan has a molecular weight of 5,000 to 1,000,000, intrinsic viscosity (30° C., 0.2M acetic acid+0.1M sodium acetate) [$\eta$] of 0.25 to 20 dl/g-chitosan and, a colloid equivalent (a cationic density) of 1.0 to 6.2 meq/g-chitosan. Degree of deacetylation may be sufficient so long as chitin is deacetylated to such a degree as being dissolved by using an acid; preferred degree of deacetylation is, for example, approximately 50 to 100 mol %. A mean grain diameter of chitosan is preferably about 9 to 300 mesh.

Any acid is usable as the acid for forming the acidic aqueous solution of the thus obtained chitosan, so long as it dissolves chitosan. Representative examples of the acid include organic acids such as acetic acid, formic acid, propionic acid, butyric acid, valeric acid, isopropionic acid, isobutyric acid, isovaleric acid, benzoic acid, cinnamic acid, salicylic acid, anthranylic acid, phthalic acid, etc.; mineral acids such as hydrochloric acid, nitric acid, etc.

It is preferred that an amount of the acid used be minimized as less as possible. The acid is used in the lowest limit that can dissolve chitosan. In general, 0.5 to 5-fold (by weight) amount of the acid is added to chitosan.

The concentration of chitosan in the chitosan acidic aqueous solution is determined by appropriately determined solubility depending upon molecular weight and deacetylation degree of chitosan, but generally 0.1 to 20 wt %, preferably 0.5 to 5.0 wt %. A grain diameter of the formed gel is correlated with the concentration of chitosan. Therefore, when the grain diameter is wished to decrease, the concentration of chitosan may be reduced. By doing so, it is possible to control the grain diameter.

In the case where insoluble matters are present in the acidic aqueous solution of chitosan, the solution is filtered through a glass filter or a metal mesh such as stainless, copper, etc. and then provided for use.

Any material is usable as the component constituting the hydrophobic dispersing medium, so far as it can disperse the acidic aqueous solution of chitosan therein. Preferred materials are compounds having a boiling point of 100° C. or higher or azeotropic compounds wherein the dispersing medium per se can be azeotropically distilled with water. Specific examples of the former compounds include decahydronaphthalene (decalin), toluene, tetrahydronaphthalene (tetralin), xylene, ethylbenzene, diethylbenzene, anisole, hexanol, octanol, dibutyl ether, petroleum benzine, ligroin, etc.

On the other hand, any compound may be usable as the latter azeotropic compound capable of being azeotropically distilled with water, so long as it can be azeotropically distilled with water and can disperse the acidic solution of chitosan therein. Examples of such compounds include benzene, cyclohexane, toluene, chloroform, etc.

To add and disperse the chitosan acidic aqueous solution in such a hydrophobic dispersing medium, it is preferred to portionwise add slowly.

The dispersing medium described above is added to and mixed with the chitosan acidic aqueous solution in such a ratio that a ratio of the dispersion to the chitosan solution is generally in a range of approximately 100:1 to 100:100. The concentration of chitosan in the dispersion is one factor to affect the grain diameter of chitosan. The higher the concentration of chitosan, the larger the grain diameter is obtained.

As a container used for practice of the present invention, one having a wall surface to which no chitosan gel is adhered is preferable. It is preferred to use, for example, a container coated with Teflon.

In dispersing the acidic aqueous solution of chitosan in the hydrophobic dispersing medium, there may be used an organic substance capable of being azeotropically distilled with water and/or a surface active agent.

As the organic substance capable of being azeotropically distilled with water, mention may be made of benzene, methanol, ethanol, acetone, cyclohexane, toluene, chloroform, 2-pentanone, 3-pentanone, etc. The addition of the organic substance capable of being azeotropically distilled with water is very advantageous since the boiling point of water is decreased and a rate of evaporation is accelerated.

On the other hand, the surface active agent is not particularly limited but cationic and nonionic surfactants can be generally used. Examples include polyoxyethylene alkylphenyl ethers, polyoxyethylene alkyl ethers, polyoxyethylene fatty acid partial esters, polyvalent alcohol fatty acid partial esters, polyethylene polyamine fatty acid salts, etc. These surfactants serve to satisfactorily disperse the chitosan acidic aqueous solution in the dispersing medium and are advantageous particularly in the case of preparing chitosan having a small grain diameter. An amount of the surfactant added is generally not greater than 50 wt % based on the chitosan solution.

These azeotropically distillable organic substances or surfactants may also be added to the acidic aqueous solution of chitosan or to the dispersing medium.

To evaporate and remove water from the thus obtained dispersion obtained by dispersing the acidic aqueous solution of chitosan in the hydrophobic dispersing medium, the dispersion is generally heated to 50° to 100° C. while stirring. In the case that the hydrophobic dispersing medium is a dispersing medium capable of being azeotropically distilled with water or in the case of adding an organic substance capable of being azeotropically distilled with water, heating is made at temperatures lower than the azeotropic point.

It is preferred that the dispersion is stirred at a high speed to prepare uniform grains. In order to stir, for example, 1 liter of the dispersion, preferred are a rotation number of 300 to 5,000 r.p.m., especially 400 to 3000 r.p.m. and a peripheral speed of 1 to 20 m/sec. The stirring rate is one factor that affects the grain diameter of the obtained chitosan. The slower the stirring rate, the larger the grain diameter.

As the endpoint of evaporating and removing moisture, an apparent measure may be the point when more than 80 wt % of water in the chitosan acidic aqueous solution used is evaporated off and removed.

As means for evaporating and removing water, there may be also adopted, in addition to the simple heating described above, a reduced pressure system, a gas blowing system (blowing of, e.g., $N_2$ gas), a refluxing system, etc. A preferred embodiment comprises separating water from the azeotropic compound by reflux, returning the dispersing medium or organic substance constituting the azeotropic compound with water back to the system and re-using them.

From the concentrated system by evaporating off and removing water, the formed chitosan grains are recovered generally by filtration.

The recovered chitosan grains are washed with a solvent that does not dissolve chitosan itself but dissolves the dispersing medium, azeotropic compound, etc., preferably with a solvent that also dissolves water, for example, ethanol, acetone, etc., if necessary and desired, followed by washing with an alkali. The alkali washing is performed with an aqueous solution of NaOH, KOH, $NH_3$ or the like or a mixture thereof with an organic solvent. When the alkali washing is performed, a step of removing the residual alkali by, for example, washing with water, etc. is performed.

The chitosan grains obtained can be stored generally in a mixture of water and ethanol in a gel state.

If necessary and desired, the chitosan grains may also be crosslinked with epichlorohydrin, glutaraldehyde, organic diisocyanate, etc.

According to the method of the present invention for preparing granular porous chitosan, the following excellent effects are exhibited.

(i) According to the present invention, there is no need to take the trouble to degrade chitosan to a low molecular weight but commercially available chitosan having a high molecular weight can be used as it is.

(ii) According to the present invention, complicated operations for keeping the composition of basic aqueous solution as in conventional solidification in basic aqueous solution are unnecessary.

(iii) In the present invention, concentration of chitosan in the acidic aqueous solution, a rate of the chitosan acidic aqueous solution added to the dispersing medium, a stirring rate, treating temperature, degree of reducing pressure, a mixing rate of azeotropic compound to water or the dispersing medium, a molecular weight of chitosan, degree of deacetylation, etc. can be controlled so that the grain diameter and pore diameter can be freely controlled.

Hereafter the present invention is described in detail by referring to the examples below.

EXAMPLE 1

In 1 liter of 0.5 wt % acetic acid aqueous solution was dissolved 5 g of chitosan having an intrinsic viscosity of 13.5 (dl/g), a colloid equivalent of 4.9 (meq/g), a molecular weight of about 180,000, a grain diameter of 9 mesh-pass to 200 mesh-on with an average of 16 to 24 mesh and a deacetylation degree of 82 mol % to prepare 0.5 wt % acidic aqueous solution of chitosan.

The aqueous solution, 50 ml, was added to 1 liter of decalin charged in a container of 2 liters. The mixture was stirred at 1,500 r.p.m. for 30 minutes with a cross-shaped stirring blade to disperse them.

While maintaining the dispersed state above, the dispersion was heated on a water bath of 80° C., whereby about 90 wt % of water in the chitosan acidic aqueous solution used was evaporated off and removed for 12 hours. After water was removed, the white product was obtained. The product was isolated by filtration. After washing with ethanol several times, then with 0.01N sodium hydroxide aqueous solution several times and finally with water, the granular product was obtained.

Scanning electron microscopic observation of the obtained grains reveals that the product was uniform porous grains having a grain diameter of about 0.2 mm.

EXAMPLE 2

The chitosan acidic aqueous solution, 50 ml, prepared in Example 1 was dispersed in 800 ml of decalin and 200 ml of benzene in a manner similar to Example 1. The granular product was obtained in a manner similar to Example 1. During the course of reaction, benzene was separated from water by reflux and benzene was recycled to the reactor.

Scanning electron microscopic observation of the obtained grains reveals that the product was uniform porous grains having a grain diameter of about 0.3 mm.

This example is a case in which an azeotropic compound (benzene) is added to the system of Example 1. By adding the azeotropic compound, the reaction time could be shortened almost to the half (5 hours) required for Example 1.

EXAMPLE 3

The granular product was obtained in a manner similar to Example 2 except that 50 ml of the chitosan acidic aqueous solution prepared in Example 1 was dispersed in a mixture of 800 ml of decalin and 200 ml of benzene by stirring at 650 r.p.m. using a cross-shaped stirring blade.

Scanning electron microscopic observation of the obtained grains reveals that the product was uniform porous grains having a grain diameter of about 0.5 mm.

This example is a case in which a stirring rate was set to be slower than in Example 2. By doing so, a gel having a larger grain diameter could be obtained.

EXAMPLE 4

The granular product was obtained in a manner similar to Example 2 except that 50 ml of the chitosan acidic aqueous solution prepared in Example 1 was dispersed in a mixture of 800 ml of decalin and 200 ml of benzene by stirring at 2900 r.p.m. using a cross-shaped stirring blade.

Scanning electron microscopic observation of the obtained grains reveals that the product was uniform porous grains having a grain diameter of about 0.06 mm.

This example is a case in which a stirring rate was set to be faster than in Example 2. By doing so, a gel having a smaller grain diameter could be obtained.

EXAMPLE 5

In 200 ml of 1 wt % acidic aqueous solution was dissolved 2 g of chitosan having an intrinsic viscosity of 3.2 (dl/g), a colloid equivalent of 6.2 (meq/g), a molecular weight of about 53,000, an average grain diameter of 45 to 200 mesh and a deacetylation degree of 100 mol % to prepare 1 wt % acidic aqueous solution of chitosan.

The granular product was obtained in a manner similar to Example 2 using 50 ml of the aqueous solution described above.

Scanning electron microscopic observation of the obtained grains reveals that the product was uniform porous grains having a grain diameter of about 1.3 mm.

This example is a case in which the concentration of chitosan solution dispersed was set to be higher than in Example 2. By doing so, a gel having a larger grain diameter could be obtained.

EXAMPLE 6

The granular product was obtained in a manner similar to Example 2 except that 25 ml of the chitosan acidic aqueous solution prepared in Example 1 was used.

Scanning electron microscopic observation of the obtained grains reveals that the product was uniform porous grains having a grain diameter of about 0.1 mm.

This example is a case in which an amount of the chitosan solution dispersed was set to be smaller than in Example 2. By doing so, a gel having a smaller grain diameter could be obtained.

EXAMPLE 7

The granular product was obtained in a manner similar to Example 2 except that 80 ml of the chitosan acidic aqueous solution prepared in Example 1 was used.

Scanning electron microscopic observation of the obtained grains reveals that the product was uniform porous grains having a grain diameter of about 0.5 mm.

This example is a case in which an amount of the chitosan solution dispersed was set to be larger than in Example 2. By doing so, a gel having a larger grain diameter could be obtained.

EXAMPLE 8

The granular product was obtained in a manner similar to Example 2 except that 50 ml of the chitosan acidic aqueous solution prepared in Example 1 was dispersed in a dispersing medium obtained by adding 10 ml of Nonipol 110 (manufactured by Sanyo Chemical Industry Co., Ltd.) to a mixture of 800 ml of decalin and 200 ml of benzene as in Example 2.

Scanning electron microscopic observation of the obtained grains reveals that the product was uniform porous grains having a grain diameter of about 0.08 mm.

This example is a case in which a surface active agent was further added to the system of Example 2. By doing so, a gel having a smaller grain diameter could be obtained.

What is claimed is:

1. A process for preparing granular porous chitosan which comprises:
   a step of dispersing an acidic aqueous solution of chitosan in a hydrophobic dispersing medium; and,
   a step of evaporating water off while stirring the resulting dispersion.

2. A process according to claim 1, wherein said chitosan is obtained by deacetylation and has an acetylation degree of 50 to 100 mol %.

3. A process according to claim 1, wherein said chitosan has a molecular weight of 5,000 to 1,000,000, an intrinsic viscosity (30° C., 0.2M acetic acid+0.1M sodium acetate) of 0.25 to 20 dl/g-chitosan, a colloid equivalent of 1.0 to 6.2 meq/g-chitosan and a mean grain diameter of 9 to 300 mesh.

4. A process according to claim 1, wherein said acidic aqueous solution of chitosan contains a 0.5 to 5-fold amount of an acid based on chitosan.

5. A process according to claim 1, wherein a concentration of said chitosan in the acidic aqueous solution of chitosan is 0.1 to 20 wt %.

6. A process according to claim 1, wherein said hydrophobic dispersing medium is selected from a compound having a boiling point of not lower than 100° C. and a compound that is azeotropically distillable with water.

7. A process according to claim 6, wherein said hydrophobic dispersing medium is selected from decahydronaphthalene (decalin), toluene, tetrahydronaphthalene (tetralin), xylene, ethylbenzene, diethylbenzene, anisole, hexanol, octanol, dibutyl ether, petroleum benzine and ligroin.

8. A process according to claim 6, wherein an organic compound capable of being azeotropically distilled with water is selected from benzene, methanol, ethanol, acetone, cyclohexane, toluene, chloroform, 2-pentanone or 3-pentanone.

9. A process according to claim 1, wherein a ratio of said dispersion to the chitosan solution is in a range of 100:1 to 100:100.

10. A process according to claim 1, wherein said dispersion is heated to 50° to 100° C. to evaporate water off.

11. A process according to claim 1, wherein water is evaporated off by using a dispersing medium capable of being azeotropically distilled with water and heating to a temperature lower than the azeotropic point.

12. A process according to claim 11, wherein said dispersing medium capable of being azeotropically distilled with water is separated from water by reflux and re-used.

13. A process according to claim 11, wherein said dispersing medium capable of being azeotropically distilled with water is selected from benzene, cyclohexane, toluene and chloroform.

14. A process according to claim 1, wherein said stirring is performed at a rotation number of 300 to 5,000 r.p.m. at a peripheral speed of 1 to 20 m/sec.

15. A process according to claim 1, wherein at least 80 wt % of water is evaporated off from the acidic aqueous solution.

16. A process according to claim 1, wherein a surface active agent is added to the dispersion.

17. A process for preparing granular porous chitosan, comprising:
   preparing an acidic aqueous solution of chitosan, said chitosan having a molecular weight of 5,000 to 1,000,000 and concentration of said chitosan in the acidic aqueous solution of chitosan being 0.1 to 20 wt %,
   dispersing the acidic aqueous solution of chitosan in a hydrophobic dispersing medium, said hydrophobic dispersing medium being selected from a compound having a boiling point of not lower than 100° C. and a compound azeotropically distillable with water, and
   evaporating water from the dispersion while stirring the hydrophobic dispersing medium containing the acidic aqueous solution of chitosan.

* * * * *